United States Patent
Oyama et al.

(10) Patent No.: US 7,146,265 B2
(45) Date of Patent: Dec. 5, 2006

(54) CONTROL DEVICE WITH TIME MEASURING FUNCTION

(75) Inventors: Katsuya Oyama, Hitachinaka (JP); Shoji Sasaki, Hitachinaka (JP); Mitsuhiko Watanabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/959,146

(22) Filed: Oct. 7, 2004

(65) Prior Publication Data

US 2005/0113939 A1 May 26, 2005

(30) Foreign Application Priority Data

Oct. 8, 2003 (JP) .............................. 2003-349188

(51) Int. Cl.
- G06F 7/00 (2006.01)
- G06F 17/00 (2006.01)
- G06F 19/00 (2006.01)
- G05B 11/01 (2006.01)

(52) U.S. Cl. .......................... 701/66; 701/29; 701/102; 701/113; 701/115; 700/12; 700/13; 700/14; 307/39; 307/41; 307/103; 340/309.4; 340/309.5; 340/426.15

(58) Field of Classification Search ................ 700/11, 700/14, 12, 13; 307/41, 39, 10.3; 340/309.4, 340/309.5, 426.1, 426.36, 426.18; 701/102, 701/29, 112–115, 66
See application file for complete search history.

(56) References Cited

U.S. PATENT DOCUMENTS

| | | | | | |
|---|---|---|---|---|---|
| 4,670,007 A | * | 6/1987 | Wheeldon et al. | ............ | 604/65 |
| 4,706,194 A | * | 11/1987 | Webb et al. | .................. | 701/49 |
| 5,033,012 A | * | 7/1991 | Wohld | ......................... | 702/41 |
| 5,329,449 A | * | 7/1994 | Tanizawa et al. | ............. | 701/25 |
| 6,035,133 A | * | 3/2000 | Shiomi | ........................ | 396/55 |
| 6,241,684 B1 | * | 6/2001 | Amano et al. | ............. | 600/531 |
| 6,618,666 B1 | | 9/2003 | Amano et al. | | |
| 6,628,572 B1 | * | 9/2003 | Yabe et al. | ................. | 368/204 |

FOREIGN PATENT DOCUMENTS

JP          2002-341067          11/2002

* cited by examiner

Primary Examiner—Ramesh Patel
(74) Attorney, Agent, or Firm—Crowell & Moring LLP

(57) ABSTRACT

A control device with a time measuring function measures a turned-off time of an ignition switch with a low consumption current and high accuracy at a level adapted for a demand from the controlling side, as well as a turned-on time of the ignition switch. The control device also measures an accumulative turned-on time of the ignition switch. The control device comprises a battery, a microcomputer for computing a control variable to control a control target, a time measuring unit, a clock source for the microcomputer, a clock source for the time measuring unit, and a unit for changing over operation of the time measuring unit depending on an intended use. The time measuring unit operates regardless of run/stop of the microcomputer.

12 Claims, 6 Drawing Sheets

| 8b | 34a | 5 | |
|---|---|---|---|
| 0 | * | Stop | ~45 |
| 1 | 0 | Run | ~46 |
| | 1 | Stop | ~47 |

CONTROL DEVICE WITH TIME MEASURING FUNCTION

BACKGROUND OF THE INVENTION

1. Field of the Invention

The present invention relates to a time measuring technique for use in a control device.

2. Description of the Related Art

An engine electronic control unit (ECU) has recently faced a demand for control to measure a time during which an engine has stopped. Measuring a time during which an ignition switch is turned off, i.e., a time during which the engine electronic control unit is stopped, is required to predict, based on the time from the preceding engine stop, a cooling level of the engine and the amounts by which engine oil has dropped and restored, and then to modify control parameters at the next engine startup.

A known technique for satisfying such a demand is disclosed in, e.g., Patent Reference 1 (JP,A 2002-341067). According to the known technique, a dedicated circuit comprising a comparator, a capacitor, etc. is provided to measure a turned-off time of an ignition switch.

With the disclosed method, a microcomputer is started up at intervals of a constant time to measure the charging/discharging time of the capacitor and the number of times at which the capacitor has been charged and discharged, and the turned-off time of the ignition switch is measured by counting the number of times at which the capacitor has been charged and discharged.

SUMMARY OF THE INVENTION

However, the disclosed method has a possibility of deterioration in accuracy of the time measurement because it utilizes the charging/discharging of the capacitor. Another problem is that the microcomputer is started up to count the number of times at which the capacitor has been charged and discharged, a consumption current increases during the operation of the microcomputer.

Further, the disclosed method has just means for measuring the turned-off time of the ignition switch. In other words, because the disclosed method cannot measure a time during which the engine has operated, it is impossible to calculate the lifetime up to now which is required to predict aging and other secular changes of engine auxiliaries, etc.

Accordingly, it is an object of the present invention to measure a turned-off time of an ignition switch with a low consumption current and high accuracy at a level adapted for a demand from the controlling side, as well as a turned-on time of the ignition switch. Another object of the present invention is to measure an accumulative turned-on time of the ignition switch.

To achieve the above objects, the present invention provides a control device with a time measuring function comprising a battery, a microcomputer for computing a control variable to control a control target, a time measuring unit, a clock source for the microcomputer, and a separate clock source for the time measuring unit being independent of the clock source for the microcomputer, the time measuring unit operating regardless of run/stop of the microcomputer.

According to the present invention, the turned-off time of the ignition switch can be measured with a low consumption current and high accuracy at a level adapted for a demand from the controlling side. Further, the turned-on time of an ignition switch can be measured, and an accumulative turned-on time of the ignition switch can also be stored.

DESCRIPTION OF THE PREFERRED EMBODIMENTS

Figure 1:
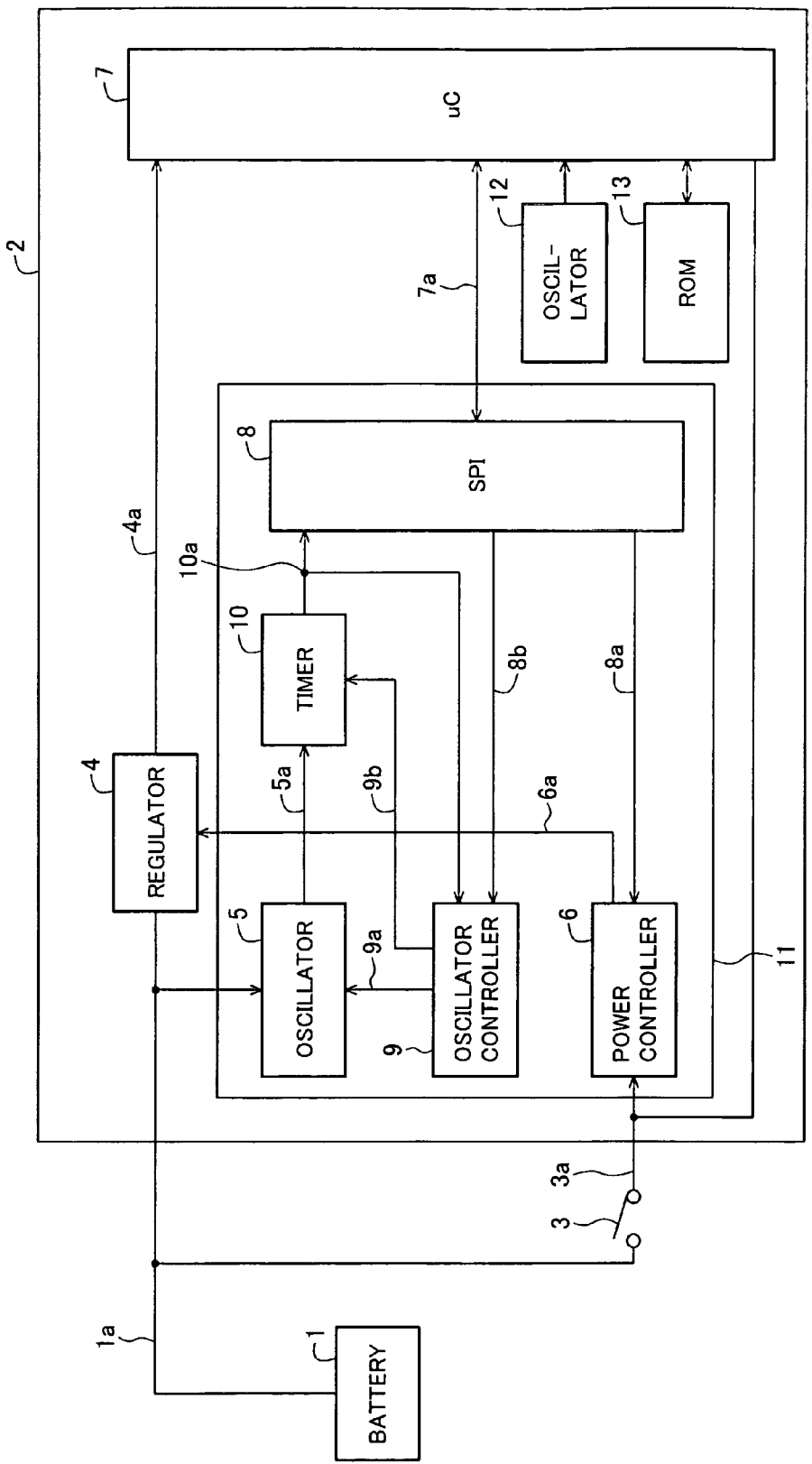
FIG. 1 is a block diagram showing an embodiment of a control device to which the present invention is applied.

FIG. 1 is a block diagram of a control device showing one embodiment of the present invention. A control device (electronic control unit (ECU)) 2 has at least two inputs for a power supply line 1a directly connected to a battery 1 and a signal line to receive a signal 3a from an ignition switch 3.

A voltage of the battery 1 is supplied to a regulator 4 and a timer module 11. Source power from the battery 1 can be supplied to the regulator 4 and the timer module 11 regardless of whether the ignition switch 3 is turned on or off.

The ignition switch signal 3a is supplied to the timer module 11 and a microcomputer 7 in the control device 2. The timer module 11 and the microcomputer 7 determine whether the ignition switch 3 is turned on or off. The timer module 11 comprises an oscillator (OSC) 5, a power controller 6, an SPI 8, an oscillator controller 9, and a timer 10.

The microcomputer 7 is associated with an oscillator 12 serving as a clock source. The clock sources for the timer module 11 and the microcomputer 7 are constituted by the respective oscillators 5, 12 different from each other, and the timer module 11 and the microcomputer 7 are implemented as individual devices. Data is transmitted and received between the timer module 11 and the microcomputer 7 via a communication line 7a. An electrically rewritable nonvolatile memory 13 stores a program executed by the microcomputer 7, and also has an area in which measured timer values are written.

In this embodiment, the timer module 11 is completely independent of the microcomputer 7 and can be operated even when no power is supplied to the microcomputer 7. Thus, when time measurement is performed by the timer module 11 while the control device 2 is stopped, no power is supplied to the microcomputer 7. Accordingly, a consumption current can be reduced. While the nonvolatile memory 13 is shown as being present externally of the microcomputer 7 in this embodiment, the nonvolatile memory 13 may be incorporated in the microcomputer 7.

A description is now made of a flow of processing in each block when the ignition switch 3 is turned on. The ignition switch signal 3a is inputted to the power controller 6 in the timer module 11. In response to detection of the turning-on of the ignition switch 3, the power controller 6 starts up the regulator 4.

When the regulator 4 is started up, a predetermined voltage is supplied to the power supply line 4a and the microcomputer 7 starts the operation. The microcomputer 7 recognizes the turning-on of the ignition switch signal 3a and starts up an OS (Operating System). Also, the power controller 6 receives a power hold signal 8a from the microcomputer 7 through the SPI 8.

In this embodiment, the power hold signal 8a is supplied from the microcomputer 7 to the SPI 8 via the communication line 7a extending between them, and then inputted to the power controller 6 after being decoded in the SPI 8. The power hold signal 8a is used to execute a key-off sequence in the microcomputer 7 when the ignition switch 3 is turned off.

First, when the ignition switch 3 is turned on, the microcomputer 7 transmits the power hold signal 8a=1 to the power controller 6 through the SPI 8 for holding the power controller 6 in an on-state.

Then, when the microcomputer 7 recognizes the turning-off of the ignition switch 3 based on the ignition switch signal 3a, it executes the key-off sequence.

After the completion of the key-off sequence, the microcomputer 7 transmits the power hold signal 8a=0 through the SPI 8. Correspondingly, the power controller 6 outputs a power control signal 6a=0 to turn off the regulator 4.

The timer 10 for measuring time operates with the oscillator 5 serving as a clock source. A counter value of the time measuring timer 10 is sent to the microcomputer 7 via a counter signal line 10a, the SPI 8 and the SPI communication line 7a, thus enabling the microcomputer 7 to read the counter value.

Also, the operation of the time measuring timer 10 is controlled by the microcomputer 7 through the SPI 8 in accordance with a value of a timer start signal 8b. In other words, the value of the timer start signal 8b controls the run/stop of the time measuring timer 10. When the oscillator controller 9 recognizes the timer start signal 8b=1 outputted from the microcomputer 7, it outputs an oscillator control signal 9a=1 to the oscillator 5.

When the oscillator 5 recognizes the oscillator control signal 9a=1, it starts the operation. Then, the time measuring timer 10 starts the operation while receiving, as a clock source, a clock signal 5a from the oscillator 5. As a result, the timer 10 is able to measure time.

Figure 2:
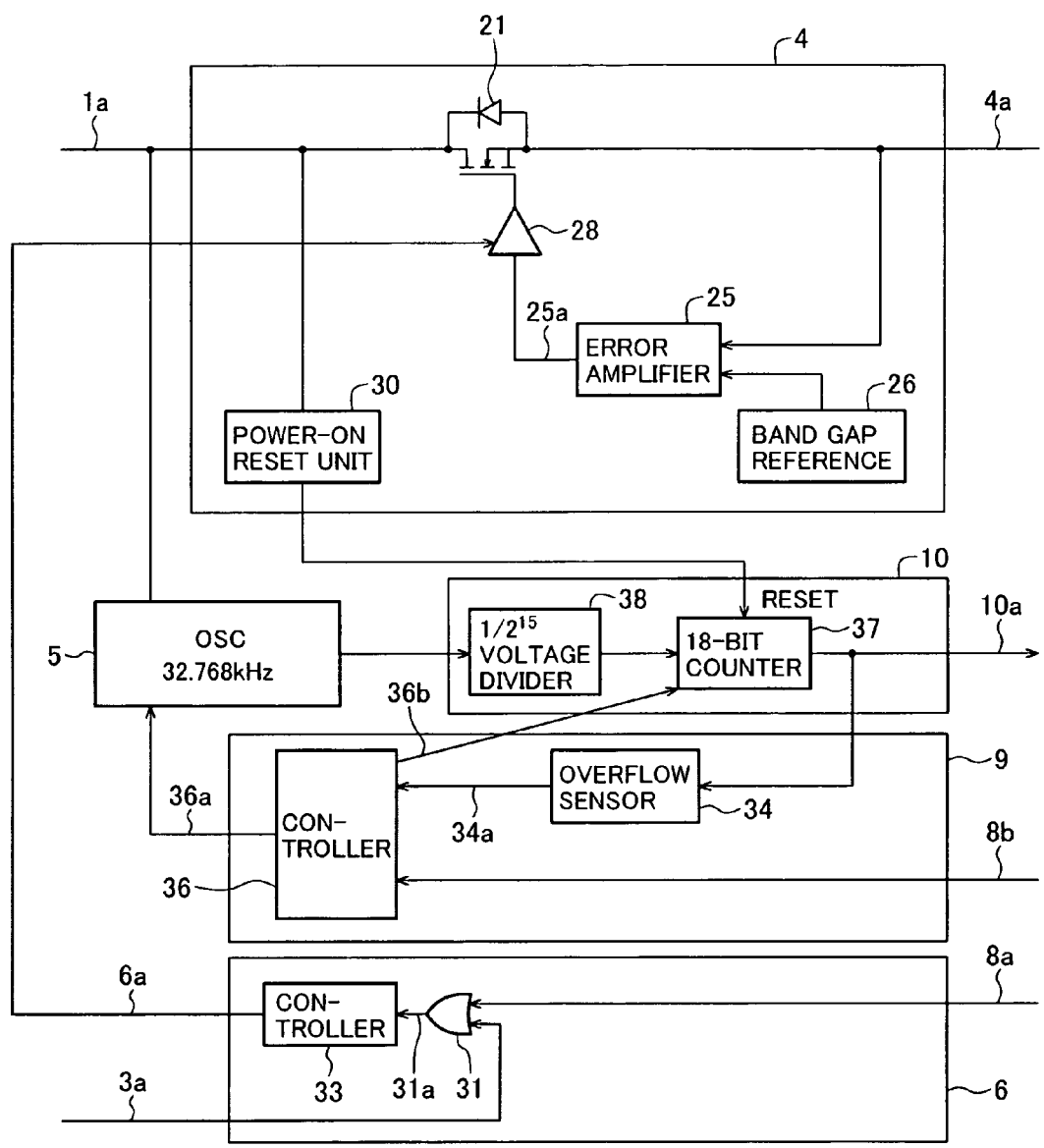
FIG. 2 is a block diagram showing a detailed internal configuration of a part of the control device shown in FIG. 1.

FIG. 2 is a block diagram showing a detailed internal configuration of the regulator 4, the oscillator 5, the power controller 6, the oscillator controller 9, and the time measuring timer 10.

The regulator 4 used in this embodiment is a linear regulator, but another type regulator, e.g., a switching regulator, can also be used. A transistor 21 is controlled by an error amplifier 25 so that the predetermined voltage is outputted to the power supply line 4a.

The voltage of the power supply line 4a is compared in the error amplifier 25 with a band gap reference 26 as an absolute reference voltage. A control signal 25a from the error amplifier 25 is outputted to the transistor 21 through a pre-driver 28 for the transistor 21. A gate voltage of the transistor 21 is thereby linearly controlled to produce the predetermined voltage.

The power control signal 6a from the power controller 6 is inputted to the pre-driver 28 to control the run/stop of the regulator 4. The power control signal 6a=1 starts the operation of the regulator 4, and 6a=0 conversely stops the operation of the regulator 4.

A power-on reset unit 30 initializes a counter 37 of the time measuring timer 10, etc. provided in the control device 2 so that the control device 2 is brought into an initial state when the battery 1 is connected.

The power controller 6 determines the operation based on two input signals, i.e., the ignition switch signal 3a and the power hold signal 8a. The ignition switch signal 3a is directly inputted to an OR gate 31. The power hold signal 8a from the microcomputer 7 is inputted to the OR gate 31 through the SPI 8.

Herein, a command value from the microcomputer 7 is given as the power hold signal 8a=1 when the power is held, and as the power hold signal 8a=0 when the power is shut down. Therefore, a controller 33 outputs the power control signal 6a=1 in response to the ignition switch signal 3a=1 or the power hold signal 8a=1 from the microcomputer 7. The power control signal 6a=1 enables the operation of the pre-driver 28.

Conversely, the controller 33 outputs the power control signal 6a=0 in response to the ignition switch signal 3a=0 or the power hold signal 8a=0 from the microcomputer 7, thereby disabling the operation of the pre-driver 28.

The oscillator controller 9 comprises an overflow sensor 34 and a controller 36. The overflow sensor 34 senses an overflow of the counter 37 of the time measuring timer 10. Upon sensing the overflow, the overflow sensor 34 outputs an overflow signal 34a=1 to the controller 36. Conversely, when there occurs no overflow, the overflow sensor 34 outputs an overflow signal 34a=0 to the controller 36.

The controller 36 controls the operations of both the oscillator 5 and the time measuring timer 10 in accordance with two input signals, i.e., the overflow signal 34a and the timer start signal 8b.

Respective states of those signals are described in more detail below with reference to FIG. 3. The oscillator 5 operates at oscillation frequency of 32.768 kHz, for example. The time measuring timer 10 comprises a frequency divider 38 and the counter 37. Herein, the oscillation frequency of 32.768 kHz from the oscillator 5 is divided to $\frac{1}{2^{15}}$ by the frequency divider 38 so that the LSB of the counter 37 is one second from the viewpoint of control demand. In this embodiment, the counter 37 is constituted as an 18-bit counter.

Figures 3, 4:
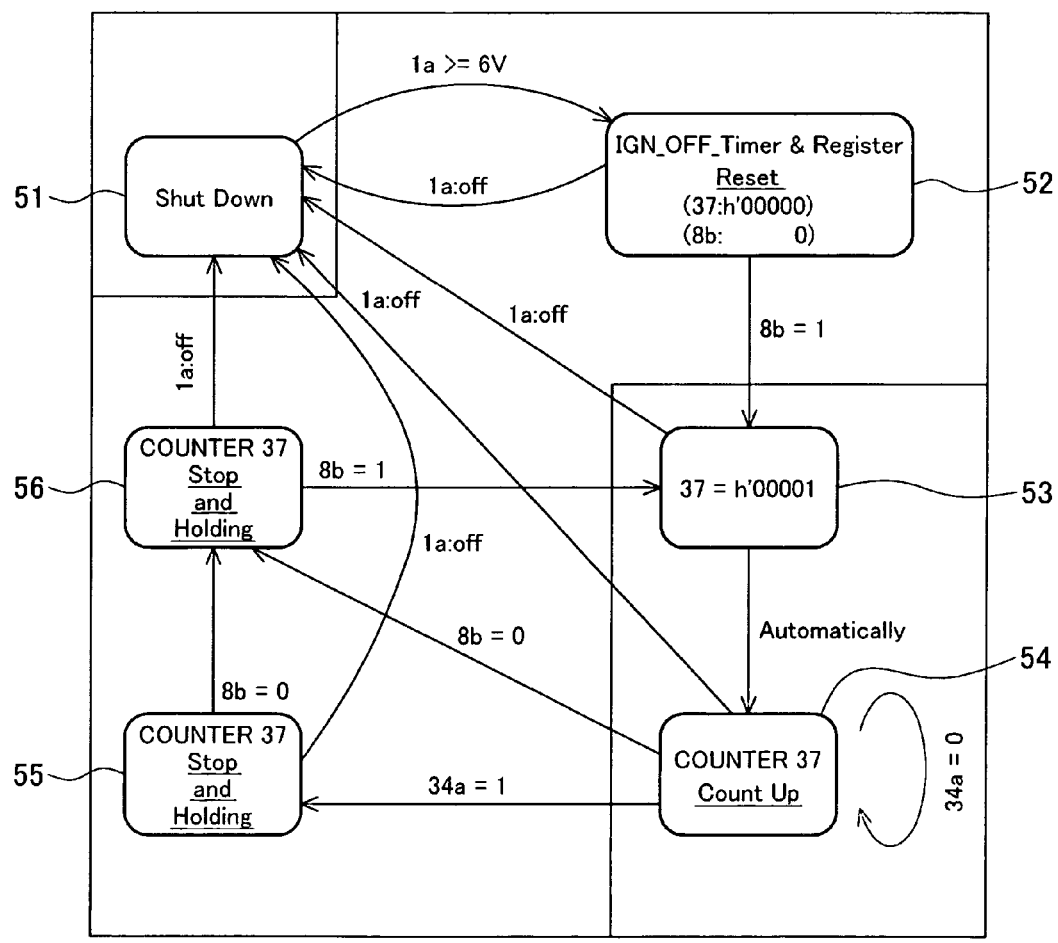
FIG. 3 is a table showing states of a clock source in the control device shown in FIG. 1.
FIG. 4 illustrates state transitions of the control device shown in FIG. 1.

FIG. 3 is a table showing run/stop states of the oscillator 5 in accordance with the timer start signal 8b from the microcomputer 7 and the overflow signal 34a from the time measuring timer 10. The following description is made of, in particular, the case in which the ignition switch 3 is turned off, i.e., the regulator 4 is stopped.

When the timer start signal 8b=0 is inputted, the oscillator 5 is stopped. As the oscillator 5 is stopped while the regulator 4 is stopped, the consumption current is minimized. (See state 45)

When the timer start signal 8b=1 is inputted, the run/stop of the oscillator 5 is determined based on the overflow signal 34a. During a period of the timer start signal 8b=1, the turned-off time of the ignition switch 3 is measured. Stated another way, during that period, the counter 37 continues the count-up. (See state 46)

Assuming, as described above, that the LSB of the counter 37 is one second, because the counter 37 is constituted as a 18-bit counter, the timer function of this embodiment is able to measure the turned-off time of the ignition switch 3 for h'3FFFF seconds, i.e., 72.8 hours, with a resolution of one second.

Also, when the counter 37 overflows and the overflow signal 34a=1 is inputted, the overflow is sensed by the overflow sensor 34 to hold the count value of the counter 37, and at the same time the oscillator 5 is stopped. (See state 47) Thus, the stop of the oscillator 5 brings the consumption current into the same state as 45, whereby the consumption current is minimized.

As described above, this embodiment can provide a process capable of measuring the turned-off time of the ignition switch 3 until 72.8 hours with a resolution of one second, and reducing the consumption current after the measurement for 72.8 hours.

Further, during the period of the timer start signal 8b=1, the counter 37 continues the count-up. Unless the microcomputer 7 stops the operation of the counter 37 of the time measuring timer 10, the counter 37 successively counts up one per second even after the ignition switch signal 3a has been turned on.

FIG. 4 illustrates state transitions of the oscillator 5 and the time measuring timer 10 during the turned-off period of the ignition switch 3.

An initial state is denoted by 51. In the initial state 51, the battery 1 is in a shutdown state. Therefore, the voltage of the power supply line 1a is 0 V and all the functions of the control device 2 are stopped. When the battery 1 is connected, the voltage of the power supply line 1a rises to a battery voltage.

When the voltage at which the control device 2 is operable, e.g., the voltage of the power supply line $1a \geqq 6$ V, is detected, the power-on reset unit 30 clears the counter 37 of the time measuring timer 10 to 0. Also, because of the timer start signal 8b=0, the state transits to 52.

In that state, when the microcomputer 7 reads the counter 37 of the time measuring timer 10 at the startup, the counter 37=0 is read. When the counter 37=0 is read, the microcomputer 7 recognizes that battery disconnection has occurred.

When the timer start signal 8b=1 is set in the state 52, the counter 37 of the time measuring timer 10 starts the count-up from 1 (state 53). If the counter 37 starts the count-up from 0, the microcomputer 7 reads 0 when it reads the timer value, i.e., the count value of the counter 37, before counting one second.

On that occasion, the microcomputer 7 may erroneously recognize that battery disconnection has occurred. In consideration of such a possibility, the counter 37 is designed to start the count-up from 1 in response to the timer start signal 8b=1. This avoids the microcomputer 7 from making erroneous recognition.

When the counter 37 starts the count-up from 1, the state automatically transits to 54 in which the counter 37 successively counts up one per second until reaching h'3FFFF. When the counter 37 counts up to h'3FFFF, the overflow sensor 34 senses an overflow of the counter 37 and the overflow signal 34a=1 is set.

At that time, the controller 36 sets an oscillator control signal 36a=0 and a counter control signal 36b=0, thereby stopping the oscillator 5 and holding the counter 37 (state 55). Also, when the timer start signal 8b=0 is inputted in the state 54, the controller 36 outputs the oscillator control signal 36a=0 and the counter control signal 36b=0, thereby stopping the oscillator 5 and holding the counter 37 (state 56).

Further, when the battery 1 is disconnected and the voltage of the power supply line 1a lowers in the state 54, the control device fails to function (state 51). In the state 55, the controller 36 waits for clearing of the timer start signal 8b to 0. When the timer start signal 8b=0 is inputted from the microcomputer 7, the state transits to 56 while the count value of the counter 37 is held.

In the state 56, the controller 36 waits for setting of the timer start signal 8b to 1. When the timer start signal 8b=1 is set, the counter 37 is initialized for transition to the state 53 for the count-up from 1. The counter 37 then starts the count-up from 1.

Figure 5:
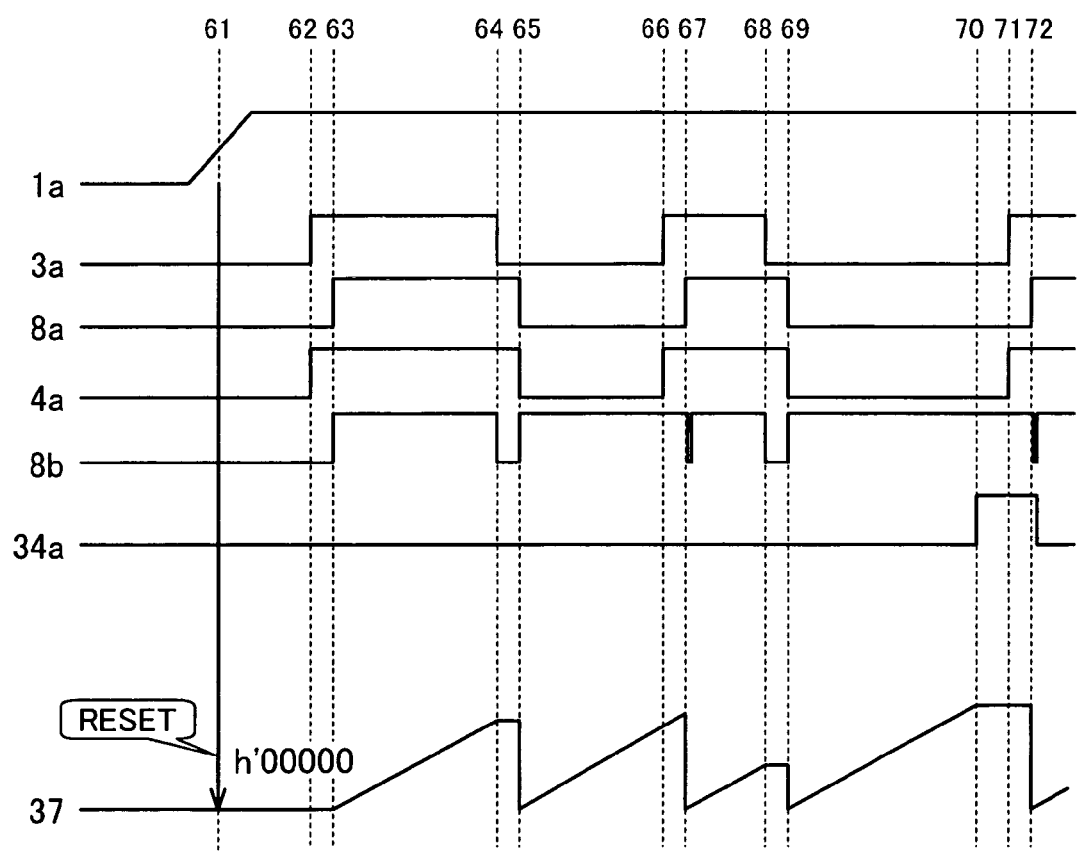
FIG. 5 is a time-serial waveform chart for the control device shown in FIG. 1.

When the battery 1 is disconnected and the voltage of the power supply line 1a lowers in any of the states 52 to 56, the control device fails to function and the state transits to 51. In FIG. 5, the oscillator 5 is operated in the states 53, 54, and the oscillator 5 is stopped in the states 52, 55 and 56.

The states 53, 54 each represent a state in which the turned-off time of the ignition switch 3 is measured with a low consumption current, and the states 52, 55 and 56 each represent a state in which the oscillator is also stopped and the consumption current is minimized.

FIG. 5 is a time-serial waveform chart showing the operating state of the time measuring timer 10. When the battery 1 is connected to the control device 2, the voltage of the power supply line 1a rises to the voltage of the battery 1. When the voltage reaches, at timing 61, a level at which the control device 2 can be started up, the counter 37 of the time measuring timer 10 is initialized to 0 by the power-on reset unit 30 in the regulator 4.

When the ignition switch 3 is turned on at timing 62, the ignition switch signal 3a=1 is inputted to the OR gate 31 of the power controller 6, and an output signal 31a=1 of the OR gate 31 is inputted to the controller 33. Responsively, the controller 33 outputs the power control signal 6a=1. Upon receiving the power control signal 6a=1, the pre-driver 28 in the regulator 4 is enabled to start up the regulator 4. As a result, an output 4a of the regulator 4 rises to the predetermined voltage.

At timing 63 representing a point in time after the microcomputer 7 has started up, the power hold signal 8a=1 is outputted to the OR gate 31 through the SPI 8 with the OS startup process in the microcomputer 7. At this time, the microcomputer 7 reads the count value of the counter 37 of the time measuring timer 10 through the SPI 8. If the count value of the counter 37 of the time measuring timer 10 is 0 (i.e., 37=0), the microcomputer 7 recognizes that the battery 1 is disconnected.

Also, to measure the turned-on time of the ignition switch 3, the microcomputer 7 transmits the timer start signal 8b=1 to the oscillator controller 9 (specifically the controller 36) through the SPI 8. Upon recognizing the timer start signal 8b=1, the controller 36 outputs the counter control signal 36b=1 to start up the counter 37 of the time measuring timer 10. In response to the counter control signal 36b=1, the counter 37 starts the count-up from h'00001. Thus, the turned-on time of the ignition switch 3 can be measured with the count-up made by the counter 37 of the time measuring timer 10.

A period from timing 63 to 64 represents a steady state in which ordinary engine control is performed. During such a period, the counter 37 of the time measuring timer 10 continues to count up one per second for time measurement. When the ignition switch signal 3a=0 is inputted at timing 64, the microcomputer 7 recognizes the turning-off of the ignition switch 3 and executes control to stop the engine. Thereafter, the microcomputer 7 executes a process of storing data into a backup RAM and each self-diagnosis process in key-off sequence.

Further, the microcomputer 7 reads the count value of the counter 37 of the time measuring timer 10 through the SPI 8. At this time, the microcomputer 7 first transmits the timer start signal 8b=0 to the controller 36 through the SPI 8, thereby stopping the operation of the counter 37 of the time measuring timer 10.

Then, the microcomputer 7 reads the count value of the counter 37 of the time measuring timer 10 through the SPI 8. Simultaneously, the counter 37 of the time measuring timer 10 is stopped in a state holding the count value.

In order to store the ignition turned-on time of a vehicle, i.e., the lifetime during which the engine has actually operated, the microcomputer 7 writes, in the nonvolatile memory 13, the sum of the read count value and the time stored in the nonvolatile memory 13. The foregoing is a process for storing the measurement result of the ignition turned-on time.

Next, to measure the turned-off time of the ignition switch 3, the microcomputer 7 transmits the timer start signal 8b=1 through the SPI 8. Upon recognizing the timer start signal 8b=1, the controller 36 outputs the counter control signal 36b=1 to start up the counter 37 of the time measuring timer 10. In response to the counter control signal 36b=1, the counter 37 starts the count-up from h'00001.

When the process for starting up the time measuring timer 10 is completed in the microcomputer 7 at timing 65, the microcomputer 7 transmits the power hold signal 8a=0 to the OR gate 31 through the SPI 8. The controller 33 recognizes the output signal value 31a of the OR gate 31 and outputs the power control signal 6a=0. Further, when the pre-driver 28 in the regulator 4 recognizes the power control signal 6a=0, the operation of the regulator 4 is stopped and the voltage of the power supply line 4a lowers.

According to the process described above, the turned-off time of the ignition switch 3 can be measured with the count-up made by the counter 37 of the time measuring timer 10. This time measurement can be realized with a low consumption current because the oscillator 5, the time measuring timer 10, and the oscillator controller 9 are only operated.

A description is now made of the operation of the time measuring timer 10 when the ignition switch 3 is turned on before the turned-off time of the ignition switch 3 reaches 72.8 hours.

When the ignition switch 3 is turned on at timing 66, the regulator 4 is started up, thus resulting in a state in which the output voltage 4a of the regulator 4 rises to the predetermined voltage as in the process at the timing 62. At timing 67 representing a point in time after the microcomputer 7 has started up, the power hold signal 8a=1 is outputted to the OR gate 31 through the SPI 8 with the OS startup process in the microcomputer 7. At this time, the microcomputer 7 first stops the counter 37 of the time measuring timer 10.

Then, the microcomputer 7 transmits the timer start signal 8b=0 through the SPI 8. When the controller 36 in the oscillator controller 9 recognizes the timer start signal 8b=0, the controller 36 outputs the counter control signal 36b=0 to stop the counter 37.

Upon recognizing the counter control signal 36b=0, the counter 37 of the time measuring timer 10 stops the count-up operation and holds the count value. Also, after the counter 37 of the time measuring timer 10 has stopped the count-up operation, the microcomputer 7 executes a step of reading the count value. The step of reading the count value is executed through the SPI 8.

With the process described above, the microcomputer 7 can measure the turned-off time of the ignition switch 3.

Further, as in the process at the timing 63, to measure the turned-on time of the ignition switch 3, the microcomputer 7 transmits the timer start signal 8b=1 to the controller 9 through the SPI 8. Upon recognizing the timer start signal 8b=1, the controller 36 outputs the counter control signal 36b=1 to start up the counter 37 of the time measuring timer 10. In response to the counter control signal 36b=1, the counter 37 starts the count-up from h'00001.

A period from timing 67 to 68 represents, like the period from timing 63 to 64, a steady state in which ordinary engine control is performed. During such a period, the counter 37 of the time measuring timer 10 continues to count up one per second for time measurement. When the ignition switch signal 3a=0 is inputted at timing 68, the microcomputer 7 recognizes the turning-off of the ignition switch 3 and executes control to stop the engine.

Stated another way, as in the process at the timing 64, the ignition switch signal 3a=0 enables the microcomputer 7 to recognize the turning-off of the ignition switch 3 and to execute control to stop the engine. Thereafter, the microcomputer 7 executes a process of storing data into a backup RAM and each self-diagnosis process in key-off sequence.

Further, the microcomputer 7 reads the count value of the counter 37 of the time measuring timer 10 through the SPI 8. At this time, the microcomputer 7 first transmits the timer start signal 8b=0 to the controller 36 through the SPI 8, thereby stopping the operation of the counter 37 of the time measuring timer 10.

Then, the microcomputer 7 reads the count value of the counter 37 of the time measuring timer 10 through the SPI 8. Simultaneously, the counter 37 of the time measuring timer 10 is stopped in a state holding the count value.

In order to store the ignition turned-on time of the vehicle, i.e., the lifetime during which the engine has actually operated, the microcomputer 7 writes, in the nonvolatile memory 13, the sum of the read count value and the time stored in the nonvolatile memory 13. The foregoing is a process for storing the measurement result of the ignition turned-on time.

Next, to measure the turned-off time of the ignition switch 3, the microcomputer 7 transmits the timer start signal 8b=1 through the SPI 8. Upon recognizing the timer start signal 8b=1, the controller 36 outputs the counter control signal 36b=1 to start up the counter 37 of the time measuring timer 10. In response to the counter control signal 36b=1, the counter 37 starts the count-up from h'00001.

When the process for starting up the time measuring timer 10 is completed in the microcomputer 7 at timing 69, the microcomputer 7 transmits the power hold signal 8a=0 to the OR gate 31 through the SPI 8. The controller 33 recognizes the output signal value 31a of the OR gate 31 and outputs the power control signal 6a=0. Further, when the pre-driver 28 in the regulator 4 recognizes the power control signal 6a=0, the operation of the regulator 4 is stopped and the voltage of the power supply line 4a lowers.

A description is now made of the case in which the turned-off time of the ignition switch 3 exceeds 72.8 hours.

At the timing 69, as described above, the counter 37 of the time measuring timer 10 starts the count-up operation. Timing 70 represents a point in time at which the counter 37 of the time measuring timer 10 has measured the turned-off time of the ignition switch 3 for 72.8 hours, i.e., h'3FFFF seconds.

The overflow sensor 34 in the oscillator controller 9 recognizes h'3FFFF in the counter 37 and outputs the overflow signal 34a=1 to the controller 36.

Upon recognizing the overflow signal 34a=1, the controller 36 outputs the oscillator control signal 36a=0 to stop the oscillation of the oscillator 5, and at the same time it outputs the counter control signal 36b=0 to stop the counter 37 of the time measuring timer 10. The control signals 36a, 36b completely stop the oscillator 5 and the counter 37, respectively.

According to the process described above, after the counter 37 of the time measuring timer 10 has measured the turned-off time of the ignition switch 3 for 72.8 hours, the consumption current can be further reduced.

A process executed during a period from timing 71 to 72 is basically the same as that executed during a period from timing 66 to 67. During the period from timing 71 to 72, the process differs only in level change of the overflow signal 34a as follows. The overflow signal 34a causes the timer start signal 8b to change from 0 to 1 at the timing 72 and is cleared when the counter 37 of the time measuring timer 10 is restarted.

Figure 6:
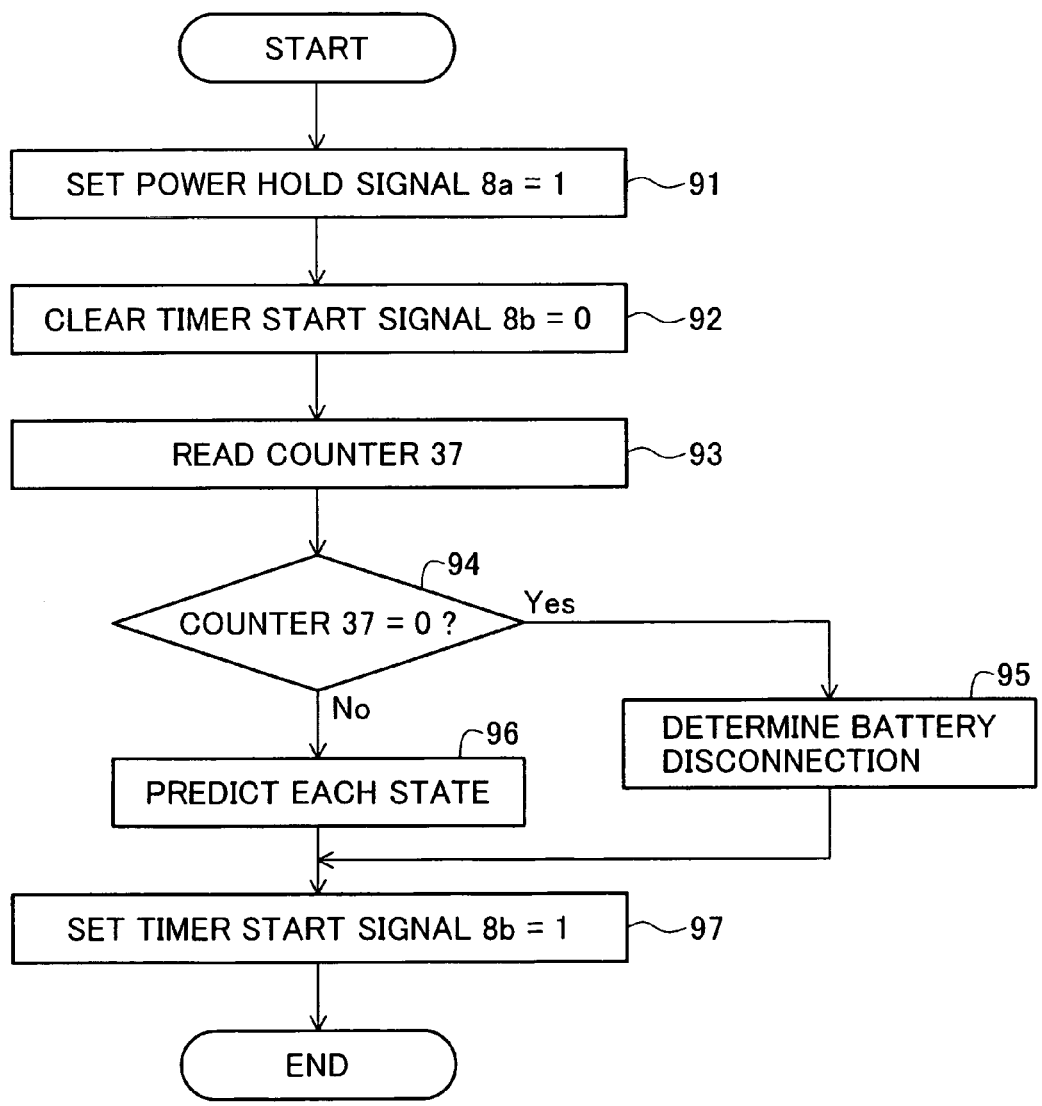
FIG. 6 is a flowchart when a microcomputer is started up.

FIG. 6 is a flowchart of the process executed by the time measuring timer 10 when the microcomputer 7 is started up. When the ignition switch 3 is turned on and the regulator 4 starts the operation, the predetermined voltage is outputted to the power supply line 4a and the microcomputer 7 starts the operation. First, in step 91, the microcomputer 7 transmits the power hold signal 8a=1 through the SPI 8 for setting the power hold signal 8a to 1.

Then, in step 92, the microcomputer 7 sets the timer start signal 8b=0 (namely clears the timer start signal 8b to 0) through the SPI 8 to stop the count-up operation by the counter 37 of the time measuring timer 10.

Then, in step 93, the microcomputer 7 reads the count value of the counter 37 of the time measuring timer 10 through the SPI 8. In step 94, it is determined whether the count value is 0 (i.e., the counter 37=0).

If the counter 37=0, processing shifts to step 95 where the occurrence of battery disconnection is determined because the counter 37=0 means that the battery disconnection has occurred during the turned-off period of the ignition switch 3.

If the counter 37≠0, the microcomputer 7 recognizes the result of the time measurement during the turned-off period of the ignition switch 3. Then, based on the turned-off time of the ignition switch 3, the microcomputer 7 predicts the amount by which engine oil has dropped, and computes control parameters at the next engine startup in consideration of the predicted amount. (Step 96).

The reading process of the time measuring timer 10 at the startup of the microcomputer 7 is completed with step 96. In step 97, the microcomputer 7 sets the timer start signal 8b=1 to measure the turned-on time of the ignition switch 3, and transits to the ordinary engine control process.

Figure 7:
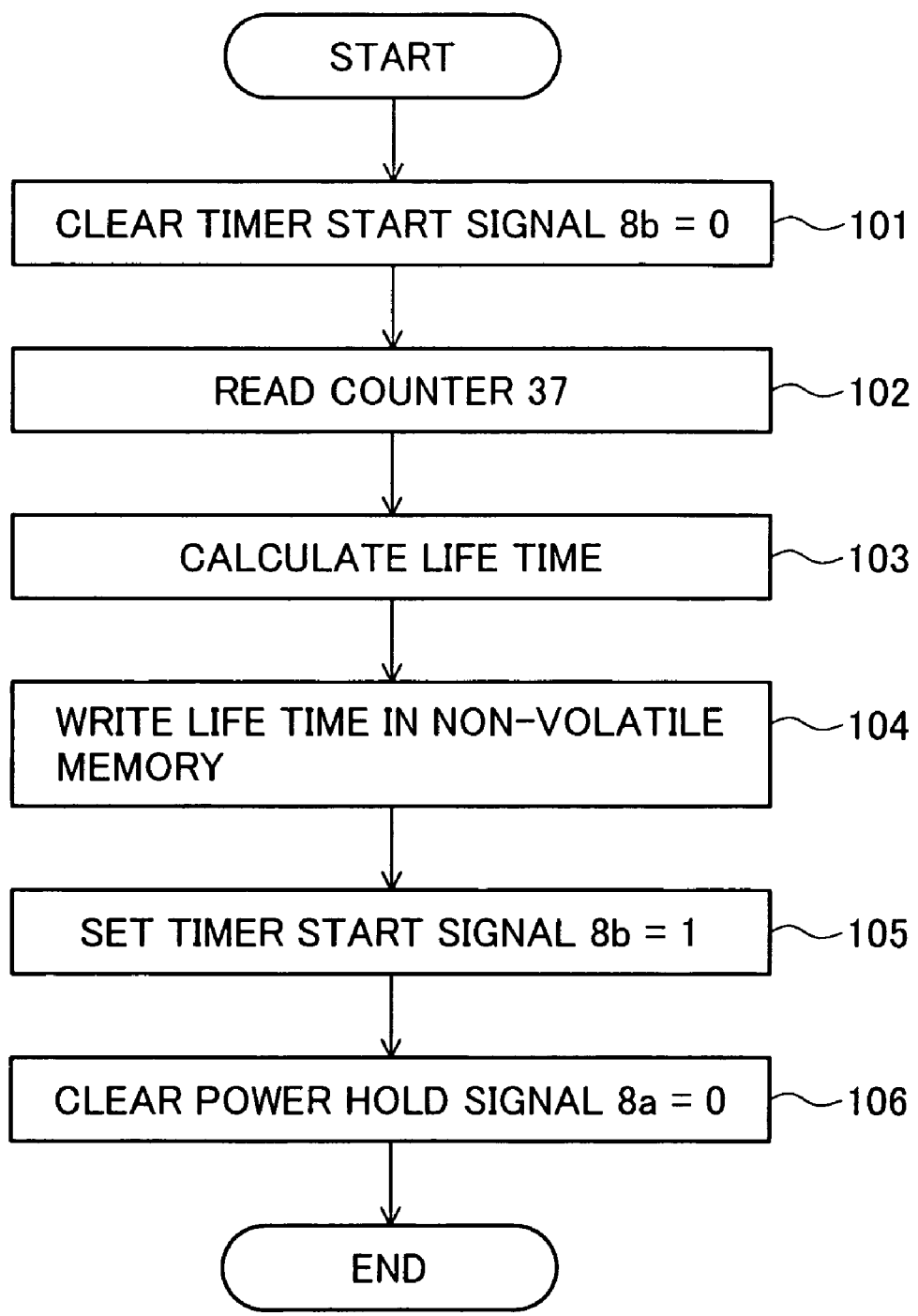
FIG. 7 is a flowchart when the microcomputer is stopped.

FIG. 7 is a flowchart of the process executed by the time measuring timer 10 when the microcomputer 7 is stopped. When the microcomputer 7 detects the turning-off of the ignition switch 3, the microcomputer 7 executes the engine control stopping process, the backup storing process, the self-diagnosis process in key-off sequence, and so on.

In step 101, the microcomputer 7 sets the timer start signal 8b=0 (namely clears the timer start signal 8b to 0) through the SPI 8 to stop the counter 37 of the time measuring timer 10 which has measured the turned-on time of the ignition switch 3 so far.

Then, in step 102, the microcomputer 7 reads the count value of the counter 37 of the time measuring timer 10 through the SPI 8. In step 103, the microcomputer 7 adds the accumulative turned-on time of the ignition switch 3 stored in the nonvolatile memory 13 and the count value of the counter 37 of the time measuring timer 10 which has been read in step 102, thereby calculating the engine lifetime. The calculated result is written in the nonvolatile memory 13 in step 104.

With the process described above, the control device 2 can recognize the accumulative turned-on time of the ignition switch 3, i.e., the engine lifetime, and can calculate parameter values adapted for aging and other secular changes of engine auxiliaries, etc. As a result, the engine control can be properly modified.

In step 105, to measure the turned-off time of the ignition switch 3, the microcomputer 7 starts up the counter 37 of the time measuring timer 10. Specifically, the microcomputer 7 transmits the timer start signal 8b=1 through the SPI 8.

Then, the power supply is shut down in step 106.

Because the ignition switch 3 is now in the turned-off state, the regulator 4 continues the operation with the power hold signal 8a=1. Accordingly, the regulator 4 is stopped when the microcomputer 7 transmits the power hold signal 8a=0 through the SPI 8 after the time measuring timer 10 has started up.

The features of the above-described embodiment are summarized as follows.

(1) The control device comprises a unit for changing over the operation of a time measuring unit (timer) depending on an intended use in accordance with an on/off signal from a power supply switch (ignition switch) for controlling the turning-on/off of source power supplied to the control device, or with a control signal from the microcomputer.

(2) The intended operation of the time measuring unit is to measure a turned-on (run) period of the control device, and the control device further comprises a unit for storing the turned-on period of the control device in combination with an electrically rewritable nonvolatile memory.

(3) The intended operation of the time measuring unit is to measure a turned-off period of the control device.

(4) The clock source for the microcomputer and the clock source for the time measuring unit are individually set up.

(5) The microcomputer and the time measuring unit are set up as individual devices.

(6) The time measuring unit includes a counter for measuring time, and the control device further comprises a unit for holding a counter value and a unit for stopping the clock source for the time measuring unit, when the counter value of the time measuring unit overflows during the measurement of the turned-off period of the control device.

(7) The control device further comprises a unit for starting count-up of the counter value from a value other than 0 or from 1 when the counter of the time measuring unit is started up.

(8) The control device further comprises a unit for detecting whether the battery is connected or disconnected, and a unit for clearing the counter value of the time measuring unit to 0 when the battery is connected again from a disconnected state.

(9) The control device further comprises a unit for controlling operation of the counter of the time measuring unit from the microcomputer.

(10) The control device is set up as an electronic control unit (ECU) for controlling an automobile engine.

What is claimed is:

1. A control device with a time measuring function utilized for a vehicle, said control device comprising:
   a microcomputer for computing a control variable to control a vehicle component;
   a timer for measuring time;

a clock source for said microcomputer; and a separate clock source for said timer being independent of said clock source for said microcomputer, wherein said timer regardless of run/stop of said microcomputer, and said microcomputer and said timer are configured to be electrically supplied from an onboard battery of the vehicle.

2. A control device with a time measuring function according to claim 1, wherein operation of said timer time is controlled by a power supply switch for controlling turning-on/off of said control device.

3. A control device with a time measuring function according to claim 2, wherein said timer selectively measures a turned-on period or a turned-off period of said power supply switch in accordance with a control signal from said microcomputer.

4. A control device with a time measuring function according to claim 2, wherein said timer measures a turned-on period of said power supply switch.

5. A control device with a time measuring function according to claim 4, further comprising an electrically rewritable nonvolatile memory and means for storing the turned-on period of said electrical supply from said onboard battery.

6. A control device with a time measuring function according to claim 2, wherein said timer measures a turned-off period of said power supply switch.

7. A control device with a time measuring function according to claim 1, wherein the clock source for said microcomputer and the clock source for said timer are individually provided independently of each other.

8. A control device with a time measuring function according to claim 1, wherein said timer includes a counter for measuring time, and said control device further comprises means for holding a counter value and means for stopping the clock source for said timer, when the counter value of said timer overflows during measurement of the turned-off period of said control device.

9. A control device with a time measuring function according to claim 8, further comprising means for starting count-up of the counter value from a value other than 0 when a counter of said timer is started up.

10. A control device with a time measuring function according to claim 9, wherein said control device further comprises means for starting count-up of the counter value from 1 when the counter of said timer is started up.

11. A control device with a time measuring function according to claim 9, further comprising means for detecting whether said onboard battery is connected or disconnected, and means for clearing the counter value of said timer to 0 when said onboard battery is connected again from a disconnected state.

12. A control device with a time measuring function according to claim 9, further comprising means for controlling operation of the counter of said timer from said microcomputer.

* * * * *